United States Patent Office 2,752,341
Patented June 26, 1956

2,752,341
STEROID HALOKETONES AND PROCESS

Barney J. Magerlein, Kalamazoo, Mich., assignor to The Upjohn Company, Kalamazoo, Mich., a corporation of Michigan No Drawing. Application July 31, 1952,
Serial No. 301,979

19 Claims. (Cl. 260—239.55)

The present invention relates to a novel process for the preparation of α-haloketones and to certain novel compounds thus produced.

This application is a continuation-in-part of my copending application, Serial Number 261,159, filed December 11, 1951, now abandoned.

It is an object of the present invention to provide a novel process for the halogenation of an enol acylate with a hypohalous acid to produce a haloketone. A further object of the invention is to provide a group of novel compounds with a halogen atom located in the position alpha to the keto-grouping. Other objects of the invention will become apparent hereinafter to those skilled in the art to which this invention pertains.

In additional to the obvious utility of the present invention in the formation of α-haloketones, the novel process of the present invention has added utility through its ability to place halogen atoms in positions of certain molecules which would be inaccessible to halogenation by conventional procedures. Illustratively, 3β,20-diacetoxy-9(11)-oxido-5,7,20-pregnatriene maleic anhydride adduct (prepared from 3β-acetoxy-9(11)-oxido-5,7-pregnadiene-20-one maleic anhydride adduct) is converted by the novel process of this invention to 3β-acetoxy-9(11)-oxido-21-chloro-5,7-pregnadiene-20-one maleic anhydride adduct in high yield, a result which is difficult, if not impossible, to obtain by conventional halogenation procedures. By the use of enol acylates as starting compounds, the position of the halogen atoms introduced by the method of the present invention may be accurately predetermined, thus facilitating the evaluation of syntheses of certain compounds which require as intermediates haloketones.

The novel process of the present invention for the production of α-haloketones includes mixing together a solution of an enol acylate in an organic solvent with an aqueous solution of a hypohalous acid to produce the desired α-haloketone, the yield frequently being almost the theoretical amount as illustrated by Example 3.

Certain of the α-haloketones produced by the process of the present invention are novel steroid derivatives. These novel compounds, and their derivatives, which contain an oxygen atom at carbon atom eleven, are of particular interest due to the known biological activity of certain eleven-oxygenated steroids. Illustratively the 3,11α-diacyloxy-17-halopregnane-20-ones may be converted to physiologically active steroid hormones such as cortisone acetate. For example, a 3,11α-diacyloxy-17-halopregnane-20-one may be dehydrohalogenated by heating with an amine such as pyridine to obtain a 3,11α-diacyloxy-16-pregnene-20-one. Subsequent treatment with a peracid such as perbenzoic acid gives the corresponding 16(17)-epoxide. The epoxide is then opened with hydrogen bromide and the resulting 16-bromo-17α-hydroxy derivative is treated with zinc dust to remove the bromine and yield a 17α-hydroxy-3,11α-diacyloxypregnane-20-one. Saponification of the ester groups with sodium hydroxide in alcohol followed by oxidation of the trihydroxy ketone with chromic acid in acetic acid yields 17α-hydroxypregnane-3,11,20-trione, which on selective reduction with sodium borohydride yields 3α,17α-dihydroxypregnane-11,20-dione. 3α,17α-dihydroxypregnane-11,20-dione is a compound known in the art which is useful for conversion to cortisone acetate [Kritchevsky et al., J. Am. Chem. Soc., 74, 483 (1952)].

As a further illustration of the uses of the products of the present invention, the 11α-acyloxy-4,17-dihalopregnane-3,20-diones may be dehydrohalogenated with pyridine to produce 11α-acyloxy-4,16-pregnadiene-3,20-diones which on reduction with hydrogen in the presence of a palladium-charcoal catalyst yields 11α-acyloxypregnane-3,20-diones. Subsequent hydrolysis with sodium hydroxide in alcohol followed by oxidation with chromic oxide gives the known pregnane-3,11,20-trione which, as is known from the art, may be converted to cortisone acetate [Von Euw, Lardon, and Reichstein, Helv. Chim. Acta., 27, 821 (1944); Kritchevsky, Garmaise, and Gallagher, J. Am. Chem. Soc., 74, 483 (1952)].

In carrying out the process of the present invention, the enol acylate, generally dissolved in an organic solvent such as, for example, acetone, alcohol, dioxane, tertiary butanol, or the like, with acetone and tertiary butanol being preferred solvents, is admixed, using either order of addition, with at least one mole equivalent of a hypohalous acid, such as hypochlorous or hypobromous acid. The hypohalous acid may be added as an aqueous solution previously prepared, or it may be formed in the reaction mixture by mixing together an agent capable of furnishing the necessary halogen, such as, for example, N-bromoacetamide, N-chlorosuccinimide, N-bromosuccinimide, and 3-bromo-5,5-dimethylhydantoin, in an organic aqueous solvent mixture containing up to about 25 percent water. The presence of an agent which increases the hydrogen ion concentration as does a mineral acid such as, for example, sulfuric acid, enhances the formation of the hypohalous acid and consequently the efficacy of the reaction. In the latter case, the halogen furnishing agent is added as a solution in an organic solvent, such as tertiary butanol, followed by a dilute solution of a mineral acid such as sulfuric acid. The reaction is preferably carried out at room temperature or thereabout, but temperatures between about zero and about eighty degrees centigrade are operative. The time of reaction is dependent on the starting material and reaction conditions employed, and may vary from a few minutes to several hours. The course of the reaction is easily followed by testing small samples, at different intervals of time, with potassium iodide solution, and thereby determining when the hypohalous acid has all reacted.

Starting materials for the method of the present invention are enol acylates of organic ketones represented by the general formula:

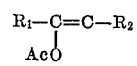

wherein AcO is an acyloxy group, Ac being the residue of an organic carboxylic acid, especially such acids containing from one to eight carbon atoms, inclusive; $R_1$ and $R_2$ are organic radicals, either alike or different, containing a total of from one to forty carbon atoms, such as, for example, methyl, ethyl, propyl, butyl, octyl, isopropyl, tertiary butyl, and the like. Furthermore, $R_1$ and $R_2$ may have a chain structure or they may be of cyclic, heterocyclic, or polycyclic structure, or a combination thereof, such as, for example, cyclopentyl, cyclohexyl, indenyl, naphthyl, a steroid nucleus, cyclohexylethyl, benzyl, and the like. $R_1$ and $R_2$ may also contain substituents which are non-reactive under the condition of the present process, such as carbalkoxy, alkoxy, halogen, and the like. Further, the enol acylate group of the starting materials for the process of the present invention may be substantially a part of the ring in a cyclic or a polycyclic compound, such as the enol acylates of cyclohexanone, cyclopentanone, substituted cyclohexanones, steroid ketones, steroid ketones substituted, at various positions on the steroid nucleus, with groups non-reactive under the conditions of the reaction such as carbalkoxy, halogen and alkoxy, and the like, for example.

As previously stated, the acyloxy groups in the starting enol acylates are of the formula AcO, wherein Ac is the residue of an organic carboxylic acid, especially such acids containing from one to eight carbon atoms, inclusive, such as formic, acetic propionic, butyric, valeric, hexanoic, heptanoic, octanoic, cyclopentanecarboxylic, cyclopentylpropionic, benzoic, toluic, and the like, although other acyloxy groups containing more than eight carbon atoms and, if desired, containing non-reactive substituents such as carbalkoxy, alkoxy, halogen, and the like, are also suitable.

Representative compounds which may be used for the process of the present invention include cyclohexanone enol acylates, isopropenyl acylates, 3,11,20-triacyloxy-17(20)-pregnenes, 3,11,20-triacyloxy - 3,17(20) - pregnadienes, enol acylates of the maleic anhydride adduct of 3-acyloxy-9(11)-oxido-5,7-pregnadiene - 20 - one, and the like. The enol acylates of cyclohexanone [Bedoukian, J. Am. Chem. Soc., 67, 1430 (1945)] and the isopropenyl acylates are both known in the art. The 3α,11α,20-triacyloxy-17(20)-pregnenes are conveniently prepared by heating 3α,11α-dihydroxypregnane-20-one or a 3α,11α-diacyloxypregnane-20-one, both known in the art [Gallagher et al., J. Biol. Chem., 165, 197 (1946)], with a large excess of an acid anhydride in the presence of an acid catalyst such as para-toluenesulfonic acid. The 3-11,20-triacyloxy-3,17(20)-pregnadienes are prepared from 11α-hydroxyprogesterone (which in turn is prepared from progesterone by a fermentation process, as more fully described in Preparation 5) by a two-step process which includes hydrogenation of 11α-hydroxyprogesterone in methanol over a palladium catalyst to yield 11α-hydroxypregnane-3,20-dione, which is then converted to the desired 3,11,20 - triacyloxy - 3,17(20) - pregnadienes with a large excess of an acid anhydride in the presence of an acid catalyst such as para-toluenesulfonic acid as more fully described in Example 9. Numerous other enol acylates of both straight chain and cyclic structure are known in the art and are suitable starting materials for the method of the present invention.

The starting enol acylates of the maleic anhydride adduct of 3-acyloxy-9(11)-oxido-5,7-pregnadiene-20-one have the formula:

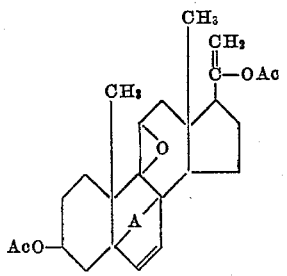

wherein Ac has the value previously assigned and A is the maleic anhydride adduct radical depicted by the graphic formula:

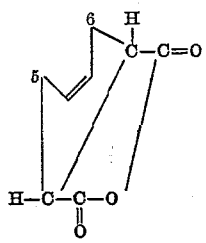

These enol acylates are prepared by heating at distillation temperature a mixture of the corresponding 3-acyloxy-9(11) - oxido-5,7-pregnadiene - 20 - one and isopropenyl acetate in the presence of a catalytic amount of para-toluenesulfonic acid, as described more fully in Preparation 12.

The 3 - acyloxy - 9(11) - oxido-5,7-pregnadiene-20-one maleic anhydride adducts are prepared by epoxidation of a 3-acyloxy-5,7,9(11)-pregnatriene-20-one maleic anhydride adduct with a peracid, such as peracetic acid.

The 3-acyloxy-5,7,9(11)-pregnatriene-20-one adducts are conveniently prepared by the selective oxidation of an enol ester of an adduct of 3-acyloxybisnor-5,7,9(11)-cholatriene-22-al, which may be represented by the formula:

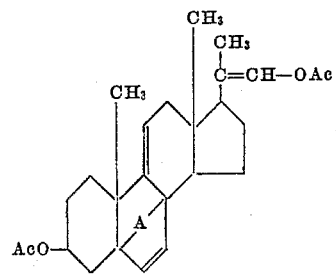

wherein A and Ac have the values previously given.

Adducts of 3,22 - diacyloxybisnor - 5,7,9(11),20(22)-cholatetraenes [22 - enol esters of 3 - acyloxybisnor-5,7,9(11)-cholatriene-22-als] are conveniently prepared by subjecting an adduct of a 3-acyloxybisnor-5,7,9(11)-cholatriene-22-al, which may be represented by the formula:

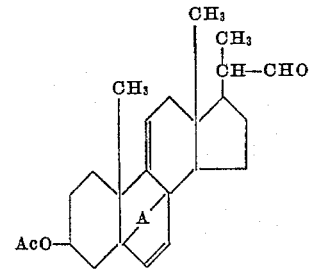

wherein A and Ac have the values previously given, to the action of an acid anhydride or an acid halide in the presence of an alkaline salt of the acid. The starting adducts of 3-acyloxybisnor-5,7,9(11)-cholatriene-22-als can be prepared from adducts of 3-esters of dehydroergosterol by selective oxidation as described and claimed in the copending application Serial Number 111,100 of Robert H. Levin, filed August 18, 1949, now Patent No. 2,620,336, and as more fully described hereinafter.

The 3-esters of dehydroergosterol, from which the 3-acyloxybisnor-5,7,9(11)-cholatriene - 22 - al adducts are prepared, can be synthesized in several ways starting with ergosterol. For example, ergosterol can be transformed to dehydroergosterol with mercuric acetate according to known methods [Windaus et al., Ann., 465, 157 (1928)] and the 3-hydroxy group of the dehydroergosterol acylated by known procedure. Alternatively, the 3-hydroxy group of ergosterol can be acylated prior to the preparation of the dehydro derivative, a procedure which is particularly preferred in the preparation of the 3-acetoxy derivative. The adducts of dehydroergosterol are then prepared by the addition of maleic anhydride or the like to dehydroergosterol or a 3-ester thereof according to known methods [Honigmann, Ann., 508, 89 (1934)].

The following examples are illustrative of the process and products of the present invention, but are not to be construed as limiting.

PREPARATION 1.—3α,11α,20-TRIACETOXY-17(20)-PREGNENE

Four hundred and five (405) milligrams of 3α,11α-dihydroxypregnane-20-one, 200 milligrams of para-toluenesulfonic acid monohydrate and seventy milliliters of acetic anhydride were heated to distillation temperature and allowed to distill slowly for three and one-half hours. A total of sixty milliliters of distillate was collected. The residue was cooled to room temperature, poured into ice-water and the resulting crystalline product collected and washed with water. Recrystallization from acetone-water yielded 332 milligrams of 3α,11α,20-triacetoxy-17(20)-pregnene, melting at 200–203 degrees centigrade.

PREPARATION 2.—3α,11α,20-TRIACETOXY-17(20)-PREGNENE

Using the same procedure as in Preparation 1, 1.0 gram of 3α,11α-diacetoxypregnane-20-one was treated with 0.45 gram of para-toluenesulfonic acid and 100 milliliters of acetic anhydride. The yield of 3α,11α,20-triacetoxy-17(20)-pregnene was 0.7 gram, melting at 200–210 degrees centigrade. A sample recrystallized from acetone-hexane and from alcohol melted at 211–213 degrees centigrade and had an $[\alpha]_D^{24}$ of minus sixteen degrees (chloroform).

*Analysis.*—Calculated for $C_{27}H_{40}O_6$: C, 70.40; H, 8.75. Found: C, 70.55; H, 8.79.

PREPARATION 3.—3α,11α,20-TRIPROPIONOXY-17(20)-PREGNENE

Using the procedure described in Preparation 1, 3α,11α-dihydroxypregnane-20-one is converted to 3α,11α,20-tripropionoxy-17(20)-pregnene with propionic anhydride in the presence of para-toluenesulfonic acid.

PREPARATION 4.—3α,11α,20-TRIBUTYRYLOXY-17(20)-PREGNENE

Using the procedure described in Preparation 1, 3α,11α-dihydroxypregnane-20-one is converted to 3α,11α,20-tributyryloxy-17(20)-pregnene with butyric anhydride in the presence of para-toluenesulfonic acid.

In a similar manner the following compounds are prepared: 3α,11α,20 - triformyloxy - 17(20)pregnene, 3α,11α20 - trivaleryloxy - 17(20) - pregnene, 3α,11α,20-trihexanoyloxy - 17(20) - pregnene, 3α,11α,20 - triheptanoyloxy - 17(20) - pregnene, 3α,11α,20 - trioctanoyloxy-17(20)-pregnene, and others.

PREPARATION 5.—11α,HYDROXYPROGESTERONE

To four liters of a 32–48 hour growth of culture RH 176 (*Rhizopus arrhizus* strain) was added one gram of progesterone in fifty milliliters of acetone, providing a suspension of the steroid in the water of the culture. The culture was then incubated at room temperature for 48 hours. At the end of this time the pH of the medium was 3.5 and the fermentation liquor and mycelia were extracted successively with three one-liter portions, one two-liter portion, and one one-liter portion of methylene chloride. The methylene chloride extracts were combined and washed with two 400-milliliter portions of two percent aqueous sodium bicarbonate solution and three 500-milliliter portions of water. The methylene chloride extract was evaporated to dryness in vacuo and the solids taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly at room temperature, whereupon 75 milligrams of crystals separated out. The mother liquor was freed of solvent by aeration, dissolved in fifty milliliters of benzene, and chromatographed over alumina ($Al_2O_3$). Fifty grams of acid-washed alumina, dried at 45 degrees centigrade, was used as adsorbent and 100-milliliter portions of solvents were used to develop the column. The solvents and the order used were as follows: benzene, benzene, benzene plus 5 percent ether, benzene plus 5 percent ether, benzene plus 10 percent ether, benzene plus 10 percent ether, benzene plus 10 percent ether, benzene plus 50 percent ether, benzene plus 50 percent ether, ether, ether, ether plus 5 percent chloroform, ether plus 5 percent chloroform, ether plus 10 percent chloroform, ether plus 10 percent chloroform, ether plus 50 percent chloroform, ether plus 50 percent chloroform, chloroform, chloroform, chloroform plus 5 percent acetone, chloroform plus 5 percent acetone, chloroform plus 10 percent acetone, chloroform plus 10 percent acetone, chloroform plus 50 percent acetone, chloroform plus 50 percent acetone, acetone, acetone, acetone plus 5 percent methanol, acetone plus 5 percent methanol, acetone plus 10 percent methanol, acetone plus 10 percent methanol, acetone plus 50 percent methanol, acetone plus 50 percent methanol. The chloroform and chloroform plus 5 percent acetone eluates were combined, evaporated to dryness, and the residue dissolved in two milliliters of hot methanol and filtered. After overnight refrigeration, 171 milligrams of crystalline 11α-hydroxyprogesterone, melting at 166 to 167 degrees centigrade, was obtained. A recrystallized sample gave the following constants: melting point, 166–167 degrees centigrade; $[\alpha]_D^{20}$ plus 175.9 degrees (chloroform).

*Analysis.*—Calculated for $C_{21}H_{30}O_3$: C, 76.40; H, 9.15. Found: C, 76.60; H, 8.92. The structure of this product was further established by its conversion, with chromic acid in acetic acid, to the known 11-ketoprogesterone [Reichstein, Helv. Chem. Acta., 23, 684 (1940); ibid., 26, 721 (1943)].

PREPARATION 6.—11α-HYDROXYPREGNANE-3,20-DIONE

Thirteen and three-tenths grams of cadmium chloride hydrate was dissolved in 100 milliliters of water at seventy degrees centigrade and a twenty percent aqueous solution of sodium carbonate then added in small portions, with constant stirring, until a precipitate of cadmium carbonate was formed. The precipitate was filtered, washed until free of residual alkali with warm water and resuspended in 100 milliliters of water to form a slurry. To this slurry was added six milliliters of an aqueous solution of palladium chloride containing 0.6 gram of palladium, and then one milliliter of 37 percent aqueous solution of formaldehyde. The mixture was warmed on a steam bath to 65 degrees centigrade and a thirty percent aqueous solution of sodium hydroxide added dropwise, with continual stirring, until palladium precipitated. The black-colored precipitate was washed by decantation with twelve successive fifty-milliliter portions of water and then filtered by suction. The precipitate on the funnel was washed eight times, dried by suction, and heated in an oven at 210 degrees centigrade for a period of thirteen hours. Seven and two-tenths grams of a palladium catalyst supported on cadmium carbonate was obtained.

Two hundred and fifty milligrams of the palladium on cadmium carbonate catalyst in 100 milliliters of methanol was hydrogenated to reduce the catalyst, 500 milligrams of 11α-hydroxyprogesterone (obtained according to the method of Preparation 5) added, and hydrogenation continued until a total of one mole equivalent of hydrogen had been absorbed. The reaction mixture was filtered, the filter cake washed with 100 milliliters of acetone in small portions, and the washings combined with the methanolic filtrate. The resulting solution was chromatographed on a column containing 25 grams of a mixture formed in a ratio of one part by weight of activated carbon (Darco G–60) to two parts by weight of diatomaceous earth (Celite 545). The column was developed with eight successive 200-milliliter portions of acetone, the first five fractions of which were combined and evaporated to dryness, producing 356.1 milligrams of 11α-hydroxypregnane-3,20-dione, a yield of seventy percent of the theoretical.

Preparation 7.—Maleic Anhydride Adduct of 3β-Acetoxybisnor-5,7,9(11)-cholatriene-22-al A two-liter round-bottom flask was charged with fifty grams (0.093 mole) of dehydroergosteryl acetate maleic anhydride adduct and one liter of methylene chloride. The solution was cooled to Dry-Ice temperature with a trichloroethylene bath and ozonized oxygen passed through at a rate of 1200 milliliters of oxygen per minute (at this rate the ozonizer was producing about 36 milligrams of ozone per minute). The flow of ozonized oxygen was maintained for 128 minutes, a total of 4608 milligrams (105 per cent) of ozone being passed into the solution. The reaction mixture was transferred to a two-liter, round-bottom flask fitted with a capillary ebullator and a condenser fitted for downward distillation, 300 milliliters of acetic acid added, and the methylene chloride distilled in vacuo below forty degrees centigrade. The flask was then placed in an ice-water bath and fitted with a stirrer. An additional 200 milliliters of acetic acid was added and the ozonide decomposed by the addition of fifty grams of zinc dust. The zinc dust was added in portions over a period of twenty to thirty minutes while the solution was stirred and the temperature was maintained at seventeen to twenty degrees centigrade. After the addition was complete, the mixture was stirred for another twenty minutes and then filtered. The zinc dust was washed by filtering 100 milliliters of acetic acid therethrough, and the filtrate gradually diluted with water (1100 to 1200 milliliters) until the product had completely precipitated. The mixture was then cooled in the refrigerator overnight and filtered. The yield of crystalline product was 42 grams, assaying 89-95 per cent of the desired aldehyde.

Preparation 8.—Maleic Anhydride Adduct of 3β-Acetoxy - 22 - Acetoxybisnor - 5,7,9(11),20(22)-Cholatetraene A mixture of twenty grams of the maleic anhydride adduct of 3β-acetoxybisnor-5,7,9(11)-cholatriene-22-al, six grams of anhydrous sodium acetate, and 600 milliliters of acetic anhydride, was heated under reflux for six hours, whereafter the volatile components were removed under reduced pressure. The resulting solid was digested with five fifty-milliliter portions of boiling acetone for five minutes each, and the extracts combined and diluted with 130 milliliters of water. There was thus obtained sixteen grams of the maleic anhydride adduct of 3β - acetoxy - 22 - acetoxybisnor-5,7,9,(11),20(22)-cholatetraene, which melted at 186 to 193 degrees centigrade. Recrystallization of the crude product from a mixture of acetone and pentane raised the melting point to 200.5 to 202 degrees centigrade.

Preparation 9.—Maleic Anhydride Adduct of 3β-Acetoxy-5,7,9(11)-pregnatriene-20-one A solution of 5.08 grams of the maleic anhydride adduct of 3β-acetoxybisnor-5,7,9(11)-cholatriene-22-al enol acetate in 100 milliliters of methylene chloride was cooled to about minus seventy degrees centigrade and ozonized until 483 milligrams of ozone had been absorbed. Fifty milliliters of glacial acetic acid was then added and the methylene chloride removed under reduced pressure. An additional thirty milliliters of glacial acetic acid was then added and the ozonide decomposed by adding seven grams of powdered zinc at a substantially uniform rate while maintaining the reaction temperature between seventeen and twenty degrees centigrade. The mixture was stirred for an additional twenty minutes, filtered, and the zinc washed with 140 milliliters of glacial acetic acid. The organic extracts were combined and diluted with seventy milliliters of water. When crystallization commenced, the rate of precipitation was increased by addition of two volumes of water. There was thus obtained 4.0 grams of the maleic anhydride adduct of 3β-acetoxy-5,7,9(11)-pregnatriene-20-one, which melted at 240 to 264.5 degrees centigrade. Several recrystallizations of the crude material from acetone raised the melting point to 263.5 to 264.5 degrees centigrade.

Preparation 10.—Maleic Anhydride Adduct of 3β-Acetoxy-9(11)-oxido-5,7-pregnadiene-20-one A solution of fifty grams of the maleic anhydride adduct of 3β-acetoxy-5,7,9(11)-pregnatriene-20-one in 1200 milliliters of glacial acetic acid was prepared by heating the ingredients together on a steam bath. The mixture was then cooled below forty degrees centigrade and fifty milliliters of thirty per cent hydrogen peroxide in 300 milliliters of glacial acetic acid added thereto. The mixture was then heated on the steam bath for one hour at a temperature of 85 degrees centigrade or above, and was then poured into three to five volumes of ice and water. The yield of crystalline product was 47.7 grams (92 per cent), having a melting point of 238 to 243 degrees centigrade, and an $[\alpha]_D^{25}$ of plus 31.1 degrees (chloroform). The product was dissolved in methylene chloride and precipitated by addition of ether to give 37.7 grams of purified product having a melting point of 254 to 259 degrees centigrade, and an $[\alpha]_D^{25}$ of plus 33.2 degrees (chloroform).

Preparation 11

In the same manner as given above for the preparation of 3β-acetoxy-9(11)-oxido-5,7-pregnadiene-20-one maleic anhydride adduct, the following compounds were prepared.

(1) Maleic anhydride adduct of 3β-benzoyloxy-9(11)-oxido-5,7-pregnadiene-20-one, melting point 258 to 260 degrees centigrade, $[\alpha]_D^{26}$ plus 24 degrees (chloroform).

(2) Maleic anhydride adduct of 3β-heptanoyloxy-9(11)-oxido-5,7-pregnadiene-20-one, melting point 168 to 169.5 degrees centigrade, $[\alpha]_D^{26}$ plus 26.1 degrees (chloroform).

In a similar manner, other maleic anhydride adducts of 3β-acyloxy-9(11)-oxido-5,7-pregnadiene - 20 - ones are prepared wherein the acyloxy group is formyloxy, propionyloxy, butyryloxy, valeryloxy, hexanoyloxy, octanoyloxy, and the like.

Preparation 12.—3β,20-Diacetoxy-9,(11)-oxido-5,7,20-pregnatriene Maleic Anhydride Adduct Nine and ninety-three one-hundredths (9.93) grams of 3β-acetoxy-9(11)-oxido-5,7-pregnadiene-20-one maleic anhydride adduct, eighty milliliters of isopropenyl acetate and one gram of para-toluenesulfonic acid were placed in a reaction flask to which was attached a short fractionating column. The mixture was heated to boiling and a mixture of acetone and isopropenyl acetate, distilling between 56 and ninety degrees centigrade, was removed over a period of about twelve hours. The para-toluene-sulfonic acid was neutralized by the addition of two grams of solid sodium bicarbonate and the excess isopropenyl acetate was removed under reduced pressure. Cold water and methylene chloride was added, with stirring, to the residue. The methylene chloride layer was separated, washed with water, dried over anhydrous sodium sulfate and the solvent removed. The residue on crystallization from a mixture of acetone and isopropyl ether yielded 8.2 grams (75 per cent) of 3β,20-diacetoxy-9(11)-oxido-5,7,20-pregnatriene maleic anhydride adduct which melted at 243 to 247 degrees centigrade. One recrystallization from acetone raised the melting point to 245 to 249 degrees centigrade. The specific rotation was $[\alpha]_D^{24}$ plus 14.2 degrees (chloroform).

Preparation 13.—3β - Benzoyloxy-20-acetoxy-9(11)-oxido-5,7,20-pregnatriene Maleic Anhydride Adduct In the same manner as given in Preparation 12, 3β-benzoyloxy - 20-acetoxy - 9(11) - oxido - 5,7,20 - pregnatriene maleic anhydride adduct is prepared from 3β-benzoyloxy-9(11)-oxido-5,7-pregnadiene-20-one maleic anhydride adduct.

PREPARATION 14.—3β-HEPTANOYLOXY-20-ACETOXY-9(11)-OXIDO-5,7,20-PREGNATRIENE MALEIC ANHYDRIDE ADDUCT

In the same manner as given in Preparation 12, 3β-heptanoyl - oxy - 20 - acetoxy - 9(11) - oxido - 5,7,20-pregnatriene maleic anhydride adduct is prepared from 3β - heptanoyloxy - 9(11) - oxido - 5,7-pregnadiene - 20-one maleic anhydride adduct.

PREPARATION 15.—3β - OCTANOYLOXY-20-ACETOXY-9,(11)-OXIDO-5,7,20-PREGNATRIENE MALEIC ANHYDRIDE ADDUCT

In the same manner as given in Preparation 12, 3β-octanoyloxy - 20 - acetoxy - 9(11) - oxido - 5,7,20 - pregnatriene maleic anhydride adduct is prepared from 3β-octanoyloxy - 9(11) - oxido - 5,7 - pregnadiene - 20-one maleic anhydride adduct. In a similar manner, other 3 - acyloxy - 20 - acetoxy - 9(11) - oxido - 5,7,20 - pregnatriene maleic anhydride adducts are prepared wherein the acyloxy group is formyloxy, propionyloxy, butyryloxy, valeryloxy, hexanoyloxy, and the like.

A. (CYCLOALIPHATIC)

*Example 1.—α-Chlorocyclohexanone*

Three milliliters of an aqueous solution containing 0.0224 mole of hypochlorous acid was added to a solution of three grams (0.0214 mole) of cyclohexanone enol acetate in thirty milliliters of acetone. After thirty minutes the resulting solution was diluted with water and extracted with ether. The ether solution was washed with water, dried and concentrated. Vacuum distillation gave a 300-milligram fraction which had the characteristic odor and crystal structure of α-chlorocyclohexanone and melted at fourteen degrees centigrade.

In a similar manner, using an enol acylate of the appropriate cyclic-ketone and the selected hypohalous acid, the following compounds are prepared: α-bromocyclohexanone α-chlorocyclopentanone, α-bromocyclopentanone, alkyl-substituted α-halocyclohexanones, alkyl-substituted-α - halocyclopentanones, α - chlorocycloheptanone, and others.

B. (ALIPHATIC)

*Example 2.—Bromoacetone*

Following the procedure given in Example 1, isopropenyl acetate is converted to bromoacetone, boiling point 136 degrees centigrade at 725 millimeters of mercury, with hypobromous acid.

In a similar manner, using an enol acylate of the appropriate dialkyl ketone and the selected hypohalous acid, the following compounds are prepared: α-chlorodiethyl ketone, 3-bromobutanone, α-chloromethyl-tertiary-butyl ketone, 5-methoxy-3-chloropentanone-2, and others.

C. (PREGNANES)

*Example 3.—3α,11α-diacetoxy-17-chloropregnane-20-one*

One milliliter of an aqueous solution containing 0.00085 mole of hypochlorous acid was added to a solution of 350 milligrams of 3α,11α,20-triacetoxy-17(20)-pregnene in fifteen milliliters of acetone. The hypochlorous acid was absorbed in three to five minutes. The solution was concentrated, diluted with water, and the resulting crystals of 3α, 11α-diacetoxy-17-chloropregnane-20-one collected. The yield of product was 330 milligrams (94 percent), melting at 208 to 210 degrees centigrade, which on recrystallization from methanol melted at 211 to 212 degrees centigrade, and had a specific rotation of $[\alpha]_D^{24}$ minus 38 degrees (chloroform).

*Analysis.*—Calculated for $C_{25}H_{37}O_5Cl$: C, 66.28; H, 8.23; Cl, 7.83. Found: C, 66.33; H, 8.26; Cl. 7.96.

*Example 4.—3α,11α-dipropionyloxy-17-chloropregnane-20-one*

Following the procedure given in Example 3, 3α,11α-dipropionyloxy-17-chloropregnane-20-one is prepared from 3α,11α,20-tripropionyloxy-17(20)-pregnene and hypochlorous acid.

*Example 5.—3α,11α-dibutyryloxy-17-chloropregnane-20-one*

Following the procedure given in Example 3, 3α,11α-dibutyryloxy-17-chloropregnane-20-one is prepared from 3α,11α,20-tributyryloxy-17(20)-pregnene and hypochlorous acid.

In a similar manner, using an enol acylate of the appropriate pregnane compound and hypochlorous acid, the following compounds are prepared: 3α,11α-diformyloxy-17-chloropregnane-20-one, 3α,11α-divaleryloxy-17-chloropregnane-20-one, 3α,11α - dihexanoyloxy-17-chloropregnane-20-one, 3α,11α-diheptanoyloxy-17-chloropregnane-20-one, 3α,11α-dioctanoyloxy-17-chloropregnane-20-one, and others.

*Example 6.—3α,11α-diacetoxy-17-bromopregnene-20-one*

To a solution of 140 milligrams (0.000304 mole) of 3α,11α,20-triacetoxy-17(20)-pregnene in five milliliters of tertiary butanol was added 59 milligrams (0.00033 mole) of N-bromosuccinimide in five milliliters of tertiary butanol followed by two milliliters of 0.08N sulfuric acid. After two hours the excess hydrobromous acid was destroyed by the addition of a few drops of sodium bisulfite solution. The solvent was evaporated and the resulting crystals washed well with water. Recrystallization from alcohol gave 100 milligrams (71 percent) of 3α,11α-diacetoxy-17-bromopregnane-20-one, melting at 191 to 200 degrees centigrade. Several recrystallizations raised the melting point to 202 to 204 degrees centigrade.

*Analysis.*—Calculated for $C_{25}H_{37}O_5Br$: C, 60.36; H, 7.50; Br. 16.07. Found: C, 60.60; H, 7.56; Br. 16.27.

*Example 7.—3α,11α-dipropionyloxy-17-bromopregnane-20-one*

Following the procedure given in Example 6, 3α,11α-dipropionyloxy-17-bromopregnane-20-one is prepared from 3α,11α,20-tripropionyloxy-17(20)-pregnene with N-bromosuccinimide and sulfuric acid.

*Example 8.—3,α11α-dibutyryloxy-17-bromopregnane-20-one*

Following the procedure given in Example 6, 3α,11α-dibutyryloxy-17-bromopregnane-20-one is prepared from 3α,11α,20-tributyryloxy-17(20)-pregnene with N-bromosuccinimide and sulfuric acid.

In a similar manner, using an enol acylate of the appropriate pregnane compound and N-bromosuccinimide, the following compounds are prepared: 3α,11α-diformyloxy-17-bromopregnane-20-one, 3α,11α-divaleryloxy-17-bromopregnane-20-one, 3α,11α - dihexanoyloxy-17-bromopregnane-20-one, 3α,11α-diheptanoyloxy-17-bromopregnane-20-one, 3α,11α-dioctanoyloxy-17-bromopregnane-20-one, and others.

*Example 9.—11α - acetoxy - 4,17 - dibromopregnane-3,20-dione*

A solution of 300 milligrams of 11α-hydroxypregnane-3,20-dione in fifteen milliliters of acetic anhydride containing 140 milligrams of para-toluenesulfonic acid was heated and allowed to distill slowly for four hours, after which time most of the acetic anhydride had been removed. The residue, after removing the last traces of acetic anhydride under vacuum, was dissolved in ether, washed with cold dilute sodium bicarbonate solution, dried over anhydrous sodium sulfate and the solvent removed. Crystallization of this residue from alcohol gave 150 milligrams of brown crystals of the di-enol acetate, 3,11α,20-triacetoxy-3,17(20)-pregnadiene, which melted at 162 to 167 degrees centigrade. Without further purification this di-enol acetate was dissolved in eight milliliters of tertiary butanol and treated with a solution of 128 milligrams of N-bromosuccinimide in fifteen milliliters of tertiary butanol and with five milliliters of 0.08 N sulfuric acid. After two hours the mixture was worked up as described in Example 9 to give 140 milligrams of crude product. Four recrystallization from alcohol gave white crystals of 11α-acetoxy-4,17-dibromopregnane-3,20-dione, melting at 201 to 203 degrees centigrade with decomposition.

Analysis.—Calculated for $C_{23}H_{32}O_4Br_2$: C, 51.89; H, 6.06; Br, 30.03. Found: C, 52.16; H, 5.96; Br, 30.01.

In a similar manner, using an enol acylate of the appropriate pregnane compound and N-bromosuccinimide, the following compounds are prepared: 11α-formyloxy - 4,17 - dibromopregnane - 3,20 - dione, 11α-propionyloxy - 4,17 - dibromopregnane - 3,20 - dione, 11α-butyryloxy - 4,17 - dibromopregnane - 3,20 - dione, 11α-valeryloxy - 4,17 - dibromopregnane - 3,20 - dione, 11α-hexanoyloxy - 4,17 - dibromopregnane - 3,20 - dione, 11α - heptanoyloxy - 4,17 - dibromopregnane - 3,20-dione, 11α - octanoyloxy - 4,17 - dibromopregnane - 3,20-dione, and others.

In a manner similar to that of Example 3, using an enol acylate of the appropriate pregnane compound and hypochlorous acid, the following compounds are prepared: 11α - formyloxy - 4,17 - dichloropregnane - 3,20-dione, 11α - propionyloxy - 4,17 - dichloropregnane - 3,20-dione, 11α - butyryloxy - 4,17 - dichloropregnane - 3,20-dione, 11α - valeryloxy - 4,17 - dichloropregnane - 3,20-dione, 11α - hexanoyloxy - 4,17 - dichloropregnane - 3,20-dione, 11α - heptanoyloxy - 4,17 - dichloropregnane - 3,20-dione, 11α - octanoyloxy - 4,17 - dichloropregnane - 3,20-dione, and others.

D. (PREGNENES)

Example 10.—3β - acetoxy - 9(11) - oxido - 21 - chloro-5,7 - pregnadiene - 20 - one maleic anhydride adduct Three-tenths (0.3) milliliter of an aqueous solution containing 0.00022 mole of hypochlorous acid was added to a solution of 100 milligrams of 3β,20-diacetoxy-9(11)-oxido-5,7,20-pregnatriene maleic anhydride adduct in five milliliters of acetone. The hypochlorous acid was absorbed essentially immediately and the mixture was evaporated to dryness to give a solid which on crystallization from alcohol-water yielded eighty milligrams of 3β-acetoxy - 9(11) - oxido - 21 - chloro - 5,7 - pregnadiene-20-one maleic anhydride adduct, melting with decomposition at 229 to 233 degrees centigrade. Three recrystallizations from a mixture of methylene chloride-ether raised the melting point to 244 to 245.5 degrees centigrade with decomposition.

Analysis.—Calculated for $C_{27}H_{31}O_7Cl$: C, 64.47; H, 6.21; Cl, 7.05. Found: C, 64.47; H, 6.37; Cl, 7.15.

Example 11.—3β - benzoyloxy - 9(11) - oxido - 21 - chloro-5,7-pregnadiene-20-one maleic anhydride adduct Following the procedure as given in Eample 10, 3β-benzoyloxy - 9(11) - oxido - 21 - chloro - 5,7 - pregnadiene - 20 - one maleic anhydride adduct is prepared from 3β - benzoyloxy - 20 - acetoxy - 9(11) - oxido - 5,7,20-pregnatriene maleic anhydride adduct and hypochlorous acid.

Example 12.—3β - heptanoyloxy - 9(11) - oxido - 21-chloro-5,7-pregnadiene-20-one maleic anhydride adduct Following the procedure as given in Example 10, 3β-heptanoyloxy - 9(11) - oxido - 21 - chloro - 5,7 - pregnadiene-20-one maleic anhydride adduct is prepared from 3β - heptanoyloxy - 20 - acetoxy - 9(11) - oxido - 5,7,20-pregnatriene and hypochlorous acid.

In a like manner, using the appropriate pregnane compound and the selected hypohalous acid, the following compounds are prepared: 3β-formyloxy - 9(11) - oxido-21 - chloro - 5,7 - pregnadiene - 20 - one maleic anhydride adduct, 3β - propionoyloxy - 9(11) - oxido - 21-chloro - 5,7 - pregnadiene - 20 - one maleic anhydride adduct, 3β - butyryloxy - 9(11) - oxido - 21 - chloro - 5,7-pregnadiene-20-one maleic anhydride adduct, 3β-valeryloxy - 9(11) - oxido - 21 - chloro - 5,7 - pregnadiene - 20-one maleic anhydride adduct, 3β-hexanoyloxy-9(11)-oxido - 21 - chloro - 5,7 - pregnadiene - 20 - one maleic anhydride adduct, 3β-octanoyloxy-9(11)-oxido-21-chloro-5,7 - pregnadiene - 20 - one maleic anhydride adduct, and their 21-bromo analogues, and others.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process for the production of an 11-acyloxy-17-halopregnane-20-one which includes mixing together (1) an organic solvent solution of an 11,20-diacyloxy-17(20)-pregnene wherein the acyloxy group has the formula AcO, Ac being the acyl radical of an organic carboxylic acid containing from one to eight carbon atoms, inclusive, and (2) an aqueous solution of a hypohalous acid, at a temperature between about zero and eighty degrees centigrade, and recovering the thus-produced 11-acyloxy-17-halopregnane-20-one.

2. A process for the production of steroid α-haloketone selected from the group consisting of 11-acyloxy-17-halopregnane-20-one and 3-acyloxy-21-halo-9(11)-oxido-5,7-pregnadiene-20-one which includes mixing together (1) an organic solvent solution of an enol acylate of a steroid ketone, selected from the group consisting of 11,20 - diacyloxy - 17(20) - pregnane and 3,20 - diacyloxy - 9(11) - oxido - 5,7,20 - pregnatriene wherein the acyloxy group has the formula AcO, Ac being the acyl radical of an organic carboxylic acid containing from one to eight carbon atoms, inclusive, and (2) an aqueous solution of a hypohalous acid, at a temperature between about zero and about eighty degrees centigrade, and recovering the thus-produced steroid α-haloketone.

3. A process for the production of a 3,11-diacyloxy-17-halopregnane-20-one which includes mixing together (1) an organic solvent solution of a 3,11,20-triacyloxy-17(20)-pregnene, wherein the acyloxy groups have the formula AcO, Ac being the acyl radical of an organic carboxylic acid containing from one to eight carbon atoms, inclusive, and (2) an aqueous solution of a hypohalous acid, at a temperature between about zero and about eighty degrees centigrade, and recovering the thus-produced 3,11-diacyloxy-17-halo-pregnane-20-one.

4. A process for the production of 3α,11α-diacetoxy-17-chloropregnane-20-one which includes mixing together (1) an organic solvent solution of 3α,11α,20-triacetoxy-17(20)-pregnene, and (2) an aqueous solution of hypochlorous acid, at a temperature between about zero and about eighty degrees centigrade, and recovering the thus-produced 3α,11α-diacetoxy-17-chloropregnane-20-one.

5. A process for the production of a 3-acyloxy-21-halo-9(11-oxido-5,7-pregnadiene-20-one which includes mixing together (1) an organic solvent solution of a 3,20-diacyloxy-9(11)-oxido-5,7,20-pregnatriene, wherein the acyloxy groups have the formula AcO, Ac being the acyl radical of an organic carboxylic acid containing from one to eight carbon atoms, inclusive, and (2) an aqueous solution of a hypohalous acid, at a temperature between about zero and about eighty degrees centigrade, and recovering the thus-produced 3-acyloxy-21-halo-9(11)-oxido-5,7-pregnadiene-20-one.

6. A process for the production of a 3-acyloxy-21-halo-9(11)-oxido-5,7-pregnadiene-20-one maleic anhydride adduct which includes mixing together (1) an organic solvent solution of a 3,20-diacyloxy-9(11)-oxido-5,7,20-pregnatriene maleic anhydride duuct, wherein the acyloxy groups have the formula AcO, Ac being the acyl radical of an organic carboxylic acid containing from one to eight carbon atoms, inclusive, and (2) an aqueous solution of a hypohalous acid, at a temperature between about zero and about eighty degrees centigrade, and recovering the thus-produced 3-acyloxy-21-halo-9(11)-oxido-5,7-pregnadiene-20-one maleic anhydride adduct.

7. A process for the production of 3β-acetoxy-21-chloro-9(11)-oxido-5,7-pregnadiene-20-one maleic anhydride adduct which includes mixing together (1) 3β,20-diacetoxy-9(11)-oxido-5,7,20-pregnatriene maleic anhydride adduct, and (2) an aqueous solution of hypochlorous acid, at a temperature between about zero and about eighty degrees centigrade, and recovering the thus-produced 3β-acetoxy-9(11)-oxido-5,7-pregnadiene-20-one maleic anhydride adduct.

8. A process for the production of a 3,11-diacyloxy-17-bromopregnane-20-one which includes mixing together (1) an organic solvent solution of a 3,11,20-triacyloxy-17(20)-pregnene, wherein the acyloxy groups have the formula AcO, Ac being the acyl radical of an organic carboxylic acid containing from one to eight carbon atoms, inclusive, and (2) N-bromosuccinimide, and (3) sulfuric acid, at a temperature between about zero and about eighty degrees centigrade, and recovering the thus-produced 3,11-diacyloxy-17-bromopregnane-20-one.

9. A process for the production of 3α,11α-diacetoxy-17-bromo-pregnane-20-one which includes mixing together (1) an organic solvent solution of 3α,11α,20-triacetoxy-17(20)-pregnene, and (2) N-bromosuccinimide, and (3) sulfuric acid, at a temperature between about zero and about eighty degrees centigrade, and recovering the thus-produced 3α,11α-diacetoxy-17-bromopregnane-20-one.

10. A process for the production of 3α,11α-diacetoxy-17-bromopregnane-20-one which includes mixing together (1) a tertiary butanol solution of 3α,11α,20-triacetoxy-17(20)-pregnene, and (2) N-bromosuccinimide, and (3) sulfuric acid, at a temperature between about zero and about eighty degrees centigrade, and recovering the thus-produced 3α,11α-diacetoxy-17-bromopregnane-20-one.

11. A process for the production of a 11-acyloxy-4,17-dibromopregnane-3,20-dione which includes mixing together (1) an organic solvent solution of a 3,11,20-triacyloxy-3,17(20)-pregnadiene, wherein the acyloxy groups have the formula AcO, Ac being the acyl radical of an organic carboxylic acid containing from one to eight carbon atoms, inclusive, and (2) N-bromosuccinimide, and (3) sulfuric acid, at a temperature between about zero and about eighty degrees centigrade, and recovering the thus-produced 11 - acyloxy-4,17-dibromopregnane-3,20-dione.

12. A process for the production of 11α-acetoxy-4,17-dibromopregnane-3,20-dione which includes mixing together (1) an organic solvent solution of 3,11α,20-triacetoxy-3,17(20)-pregnadiene, and (2) N-bromosuccinimide, and (3) sulfuric acid, at a temperature between about zero and about eighty degrees centigrade, and recovering the thus-produced 11α-acetoxy-4,17-dibromopregnane-3,20-dione.

13. A process for the production of 11-acetoxy-4,17-dibromopregnane-3,20-dione which includes mixing together (1) a tertiary butanol solution of a 3,11,20-triacetoxy-3,17(20)-pregnadiene, and (2) N-bromosuccinimide, and (3) sulfuric acid, at a temperature between about zero and about eighty degrees centigrade, and recovering the thus-produced 11-acetoxy-4,17-dibromopregnane-3,20-dione.

14. 3,11α-diacyloxy-17-halopregnane-20 - one wherein the acyloxy groups have the formula AcO, Ac being the acyl radical of a hydrocarbon monocarboxylic acid containing from one to eight carbon atoms, inclusive, and wherein the 17-halogen atom has an atomic weight between 34 and 81.

15. 3α,11α-diacetoxy-17-chloropregnane-20-one.

16. 3α,11α-diacetoxy-17-bromopregnane-20-one.

17. 3α,11α-dipropionoxy-17-bromopregnane-20-one.

18. 11α-acyloxy-4,17-dihalopregnane-3,20-dione wherein the acyloxy group has the formula AcO, Ac being the acyl radical of a hydrocarbon monocarboxylic acid containing from one to eight carbon atoms, inclusive, and wherein the halogen atoms have an atomic weight between 34 and 81.

19. 11α-acetoxy-4,17-dibromopregnane-3,20-dione.

References Cited in the file of this patent
UNITED STATES PATENTS

| | | |
|---|---|---|
| 2,369,065 | Marker | Feb. 6, 1945 |
| 2,403,683 | Reichstein | July 9, 1946 |
| 2,505,837 | Sarett | May 2, 1950 |
| 2,563,247 | Kendall | Aug. 7, 1951 |

OTHER REFERENCES

Bartlett, JACS 967–69 (1934), vol. 56.